US008725842B1

(12) United States Patent
Al-Nasser

(10) Patent No.: US 8,725,842 B1
(45) Date of Patent: May 13, 2014

(54) SMART WATCH

(71) Applicant: Khalid Al-Nasser, Riyadh (SA)

(72) Inventor: Khalid Al-Nasser, Riyadh (SA)

( * ) Notice: Subject to any disclaimer, the term of this patent is extended or adjusted under 35 U.S.C. 154(b) by 0 days.

(21) Appl. No.: 14/088,894

(22) Filed: Nov. 25, 2013

Related U.S. Application Data

(60) Provisional application No. 61/845,322, filed on Jul. 11, 2013.

(51) Int. Cl.
G06F 15/16 (2006.01)
G04C 21/16 (2006.01)
A63B 71/00 (2006.01)
G04B 47/06 (2006.01)
H04M 1/00 (2006.01)

(52) U.S. Cl.
USPC .......... 709/219; 455/556.1; 367/11; 367/274; 482/8

(58) Field of Classification Search
USPC ....... 368/11, 274; 709/219; 455/556.1; 482/8
See application file for complete search history.

(56) References Cited

U.S. PATENT DOCUMENTS

| 6,556,222 | B1 | 4/2003 | Narayanaswami | |
| 6,619,835 | B2 * | 9/2003 | Kita | 368/281 |
| 7,439,962 | B2 * | 10/2008 | Reynolds et al. | 345/173 |
| 7,946,758 | B2 | 5/2011 | Mooring | |
| 8,098,141 | B2 * | 1/2012 | Vanska et al. | 340/407.1 |
| 8,279,716 | B1 | 10/2012 | Gossweiler, III et al. | |
| 2005/0248542 | A1 * | 11/2005 | Sawanobori | 345/173 |
| 2006/0073851 | A1 | 4/2006 | Colando et al. | |
| 2008/0177751 | A1 | 7/2008 | Tan | |
| 2011/0205851 | A1 | 8/2011 | Harris | |
| 2011/0219427 | A1 | 9/2011 | Hito et al. | |
| 2013/0072765 | A1 * | 3/2013 | Kahn et al. | 600/301 |
| 2013/0158369 | A1 * | 6/2013 | Yuen et al. | 600/301 |

FOREIGN PATENT DOCUMENTS

| CN | 102866623 A | 1/2013 |
| CN | 103135440 A | 6/2013 |
| WO | 2008138086 A1 | 11/2008 |

* cited by examiner

Primary Examiner — Larry Donaghue

(57) ABSTRACT

A smart watch is provided. The smart watch includes a band unit, a network unit, a display unit and a control unit. The band unit is configured to be worn on a user's wrist. The smart watch includes a band unit that is capable of being worn on a user and includes a wrist band layer disposed on the band unit, an image capture device disposed on the band unit, a power source coupled to the image capture device, a memory coupled to the image capture device, and a motion detector coupled to the memory. The smart watch includes a network unit located in the band unit and communicates wirelessly with at least one of a portable network device and a server and a display unit being coupled to the power source, and a control unit that includes a processor and coupled to the memory, the power source, the display unit, and the network unit, the control unit receiving information from the image capture device, and the motion detector and storing information in the memory.

10 Claims, 20 Drawing Sheets

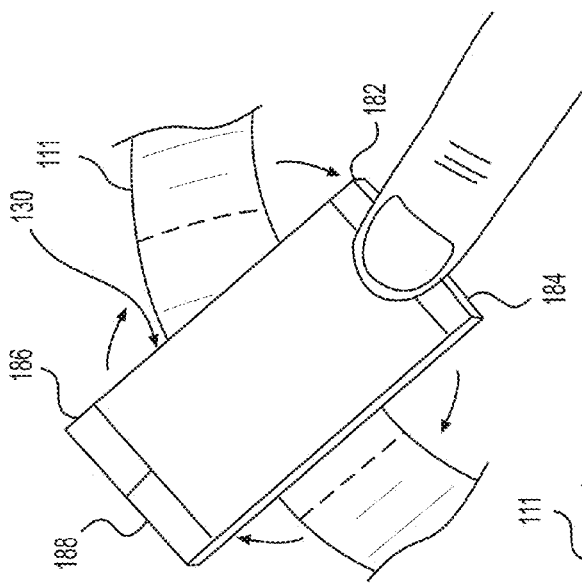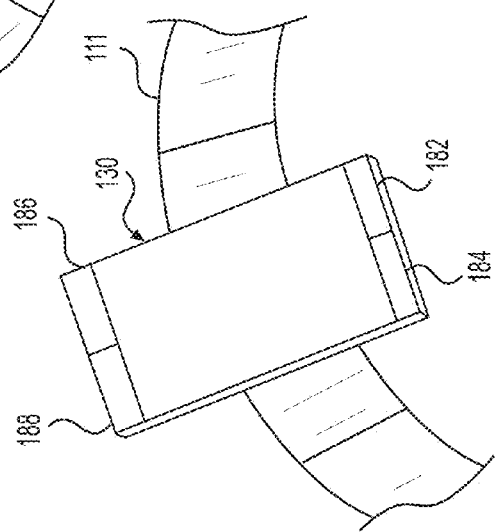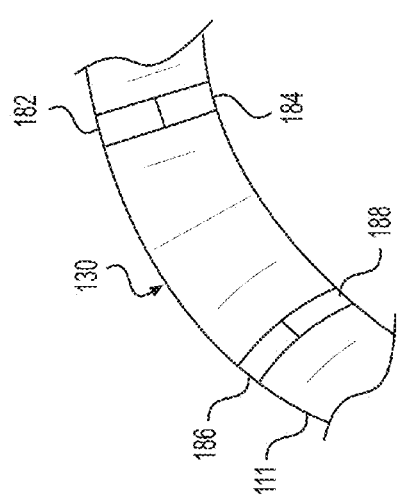

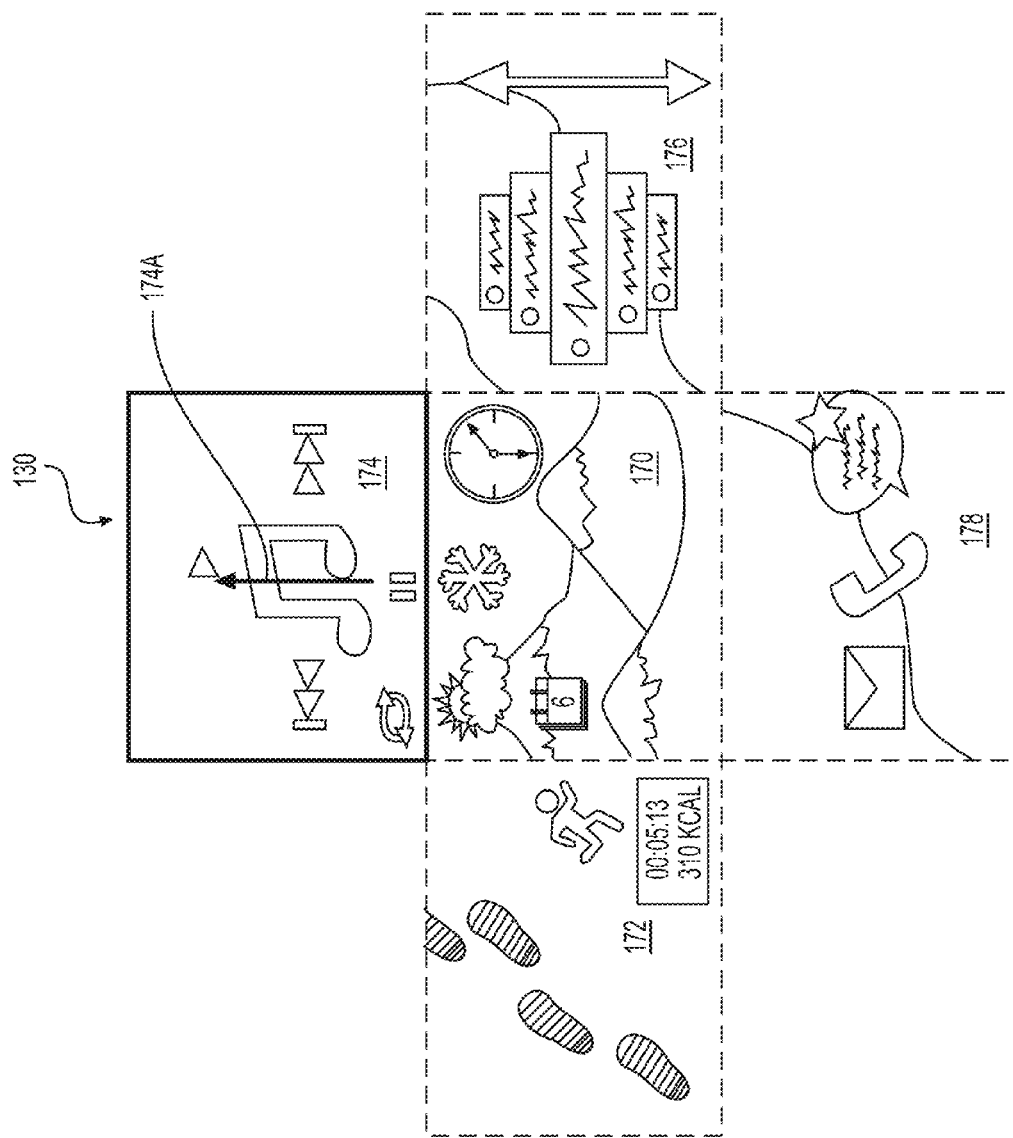

| INPUT TYPE | GPS | BARCODE | QR CODE | BUSINESS CARD | MOTION |
|---|---|---|---|---|---|
| BLUETOOTH/ NFC | BLUETOOTH | BLUETOOTH | BLUETOOTH | NFC | BLUETOOTH |

*FIG. 9*

SMART WATCH

FIELD OF THE INVENTION

This invention relates to mobile computing in general and to portable devices such as a smart watch and to the interface application necessary to work with a smart phone or other computer type hardware.

BACKGROUND OF THE INVENTION

The background of the Invention section is merely to present the context of the disclosure and the known problems and difficulties of the prior art. However, the statements herein are not admitted as prior art against the present disclosure.

In today's environment, there are difficulties in personal motivation, organization and social connections. In particularly, as a very mobile society, interconnection with others is imperative. However, many of the prior art devices and systems requires a very knowledgeable user base with sufficient learning time to acclimate themselves to the operability of a new device, the facilities and features of the device, and the interfacing of the device with other computer and computer-type systems, such as a smart phone and computer systems.

SUMMARY OF THE INVENTION

This invention relates to smart watch located on a wrist band that shows the user his or her daily tasks, notifies the user accordingly and records the user's performance based upon completion of those tasks. It also in one presently preferred embodiment monitors personal attributes of the user such as the user's calories, walking steps, location and time elapsed on certain tasks and the performance quality of the task using in a preferred embodiment features comprised of Near Field Communication connector or Bluetooth connector, a visible screen, and a motion detector such as a triple axis accelerometer. Smart watch provides an intuitive and user-friendly interface for interconnecting user's daily activities with computing devices, which include a smart phone.

In one very specific embodiment, the apparatus for smart watch includes a wrist band unit configured to be worn on a user's wrist and being comprised of a housing, a wrist band layer, a power source, an image capture device, a memory, and a motion detector. Smart watch also include a network unit located in the wrist band unit housing and configured to wirelessly communicate with at least one of a portable network device and a server, a display unit located in the wrist band unit housing and coupled to the wrist band layer, and a control unit also located in the wrist band unit housing and comprised of a processor and coupled to the display unit and the network unit.

The wrist band layer in this very specific embodiment includes a touchpad configured to perform a predetermined function in response to a first predetermined input. The first predetermined input includes at least one of a predetermined number of finger pressures, times of touches, and touch-contact time. For example, the touchpad functions as a home button command in response to one touch with a one figure input; functions as a select button command in response to two touches with one figure input; and functions as a scroll/cancel button command in response to three touches with a one figure input.

The display unit in a preferred embodiment is preferably, rotatably attached to the wrist band unit. The display unit includes an orientation sensor.

The wrist band unit further includes in the very specific embodiment a signature barcode, a protective removable cover, and a memory connector. The image capture device can be a scanner.

The display unit in the very specific embodiment includes a plurality of selectively visable screens. One of the screens denoted the home screen is normally visible to the user and the user can change the screens by the user's touch on the display in a predetermined direction.

The network device in the very specific embodiment includes a computer program that is configured to update an input information from the smart watch. The input information from the smart watch includes a distance information the user walked, calories the user has burned, a kind of food the user has eaten, and a profile of a person the user has met.

The network device is coupled to the server. The smart watch contains a source of indicia for the network device and the smart watch is used as a key for the network device when the network device authorizes a use of the key based on a communication of the source of indicia.

According to one example of a specific embodiment of the invention, a method of operating a smart watch configured to be worn on a user's wrist, includes receiving an input from a wrist band unit of the smart watch or a signal from a first portable network device, determining, by a control unit, whether the input or the signal is a predetermined type, communicating, by a network unit, with at least one of the first portable network device, a second portable network device, and a server via a wireless communication channel, and displaying a message. The wrist band unit includes an image capture device, a memory and a motion detector, and the control unit includes a processor.

The input from the wrist band unit includes a recognition of the user's motion, wherein the processor determines whether the user's motion is one of a number of predetermined motions, wherein the network unit communicates with the second portable network device including a smart phone where the second portable network device is configured to calculate the number of motions and sends a result back to the smart watch, and wherein the smart watch displays the message reflecting the result.

The image capture device scans a signature barcode of the first portable network device and saves the signature barcode information in the memory, wherein the processor determines whether the second portable network device is detected and if detected, the network unit communicates with the second portable network device so as to send the signature barcode information, and wherein the second portable network device sends the barcode information to the server and the server authenticates the barcode information and if authenticated adds a user of the first portable network device as a friend.

The processor receives a Near Field Communication signal from the first portable device and the processor receives a predetermined input including a handshake motion from the wrist band unit or a password signal from the first portable device. The network unit communicates certain predetermined information including information on a business card, photographs, and electronic files with the first portable device.

The processor receives a signal from the first portable network device and determines whether the signal is a predetermined type of signal, in which case the network unit communicates a source of indicia saved in the memory with the first portable network device. If the first portable network device authenticates the contents of the indicia, the smart watch is used as a key.

If the processor loses a signal from the first portable network device for more than a predetermined time, either the smart watch or the first portable network device sends a warning notification to the server, and in certain cases the server resets a password for the smart watch. The predetermined time can vary depending on the user's setting. For example, the predetermined time can be 10 hours or 2 days.

In a preferred embodiment, the message is displayed either in a barcode or a QR code format.

Also in a preferred embodiment, the image capture device scans a barcode for food and according to a predetermined setting, either the smart watch or the second portable network device calculates calories of the food, and wherein either the smart watch or the second portable network device displays the calorie information and communicates with either the second portable network device or the smart watch correspondingly to update the user's calorie information.

The processor receives the signal from the first portable network device and determines the type of inputs, and the network unit communicates with the first portable network device according to a predetermined setting of the type of input signal.

BRIEF DESCRIPTION OF THE DRAWINGS

FIGS. 4A, 4B and 4C are front perspective views of the wrist band that shows a rotation of the display panel with respect to wrist band;

FIGS. 6A, 6B, and 6C are screen shot a variety of selectable outputs of the smart watch display;

FIG. 9 is a table of signal types used for various input/output devices;

FIG. 1)

DETAILED DESCRIPTION OF THE PREFERRED EMBODIMENTS

Figure 1:
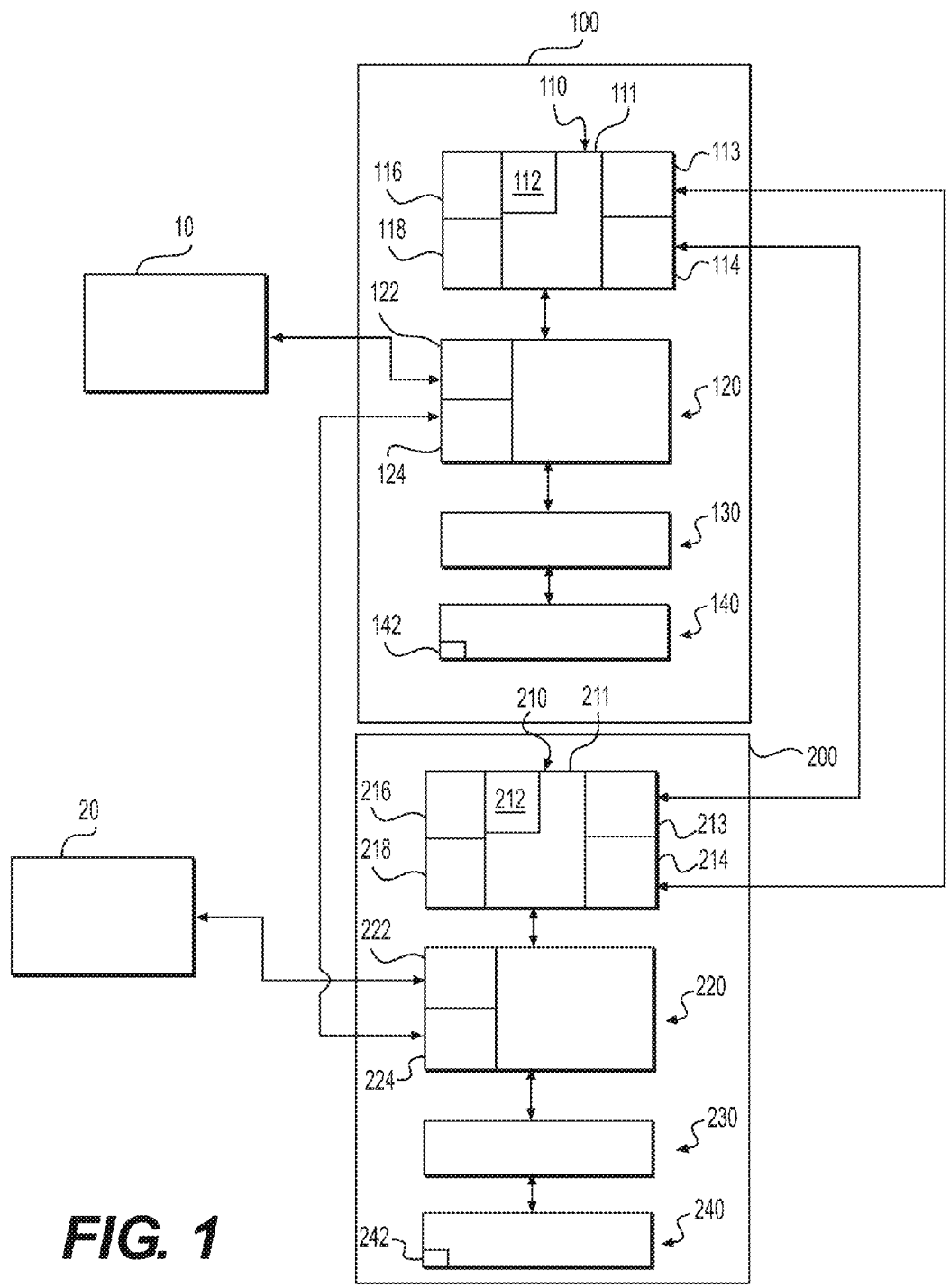
FIG. 1 is a block diagram of the components of one embodiment of the present disclosure.
Figure 2:
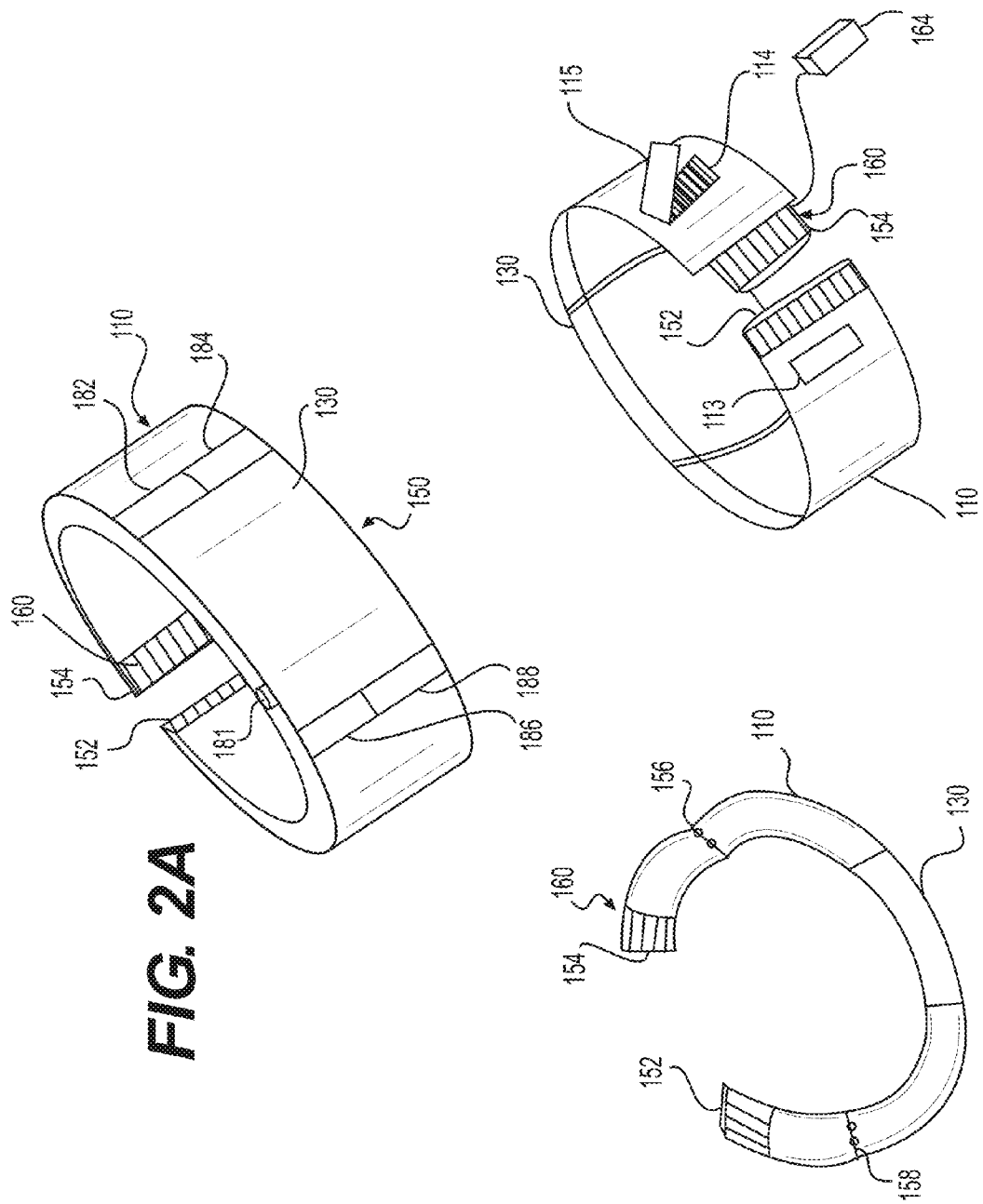
FIG. 2A is a front perspective view of a wrist band that is usable with the present invention.
FIG. 2B is a rear perspective view of the wrist band depicted in FIG. 2A, but depicting a cover over one end.
FIG. 2C is a plan view of the wrist band depicted in FIG. 2A.

Reference will now be made in detail to embodiments of the present invention, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another. These and/or other aspects become apparent and are more readily appreciated by those of ordinary skill in the art from the following description of embodiments of the present invention, taken in conjunction with the accompanying drawings.

With reference now to FIG. 1, there is depicted a block diagram of two independent computing devices "10" and "20," and two smart watches 100 and 200 that are presented for only exemplary and explanatory purposes as similar pairs of computing device 10 and smart watch 100, and computing device 20 and smart watch 200. For the purposes of this application, a "computing device" is to be interpreted broadly as including among others standard personal computers, smart phones, notebooks, tablets, "iPod", "iPad", similar Android or iOS devices, and user interface devices. Obviously, more than two independent computing devices can be employed in accordance with the present invention.

Smart watches 100 and 200, are now described in greater detail in which the same units digits and tens digits are used to identify the same components in each smart watch 100 or 200. However, only smart watch 100 is described further herein, but it is understood that smart watches 200 have the same type of components that are identified by the same units digits and tens digits.

Smart watch 100 is comprised of a wrist band unit 110, designed to be worn on the wrist of a user. Wrist band unit 110 is described in greater detail with respect to FIGS. 2-5 and comprised of a wrist band 111 made of any flexible material, preferably a polymer plastic, but could also include a standard plastic, leather, and a shaped metal band or linked metal band. Wrist band unit 110 is comprised of a wrist band layer (not shown). Wrist band layer can include an LED layer and/or a touchpad layer. Wrist band unit 110 can also be comprised of a touchpad/screen layer. In some embodiments, wrist band 111 can have a length adjustable feature. For example, each ends of wrist band 111 can include a conventional detachable metal block (not shown) or a conventional magnetic block (not shown) to adjust the length.

Wrist band unit 110 also comprises a conventional power source 112. Power source 112 is preferably a conventional, rechargeable secondary battery. Alternatively, power source 112 can be a conventional solar battery, or can be a combination of the two.

Additionally, wrist band unit 110 includes a conventional barcode scanner and/or a QR scanner 113, a signature barcode 114 that identifies a particular smart watch 100 and has a protective removable cover 115, and a conventional USB terminal 116.

Operationally, wrist band unit 110 is connected to a network unit 120 that is comprised of a wireless and/or Bluetooth communications transceiver unit 122 and a NFC (Near Field Communication) unit 124. In general, network unit 120 is a communication unit that can wirelessly communicate with smart phone 10 preferably using Bluetooth because of its relatively longer range. Network unit 120 can also communicate with another wrist band unit, such as second smart watch unit 200, preferably by using an NFC device because of its relatively limited range.

For conventional practical reasons, network unit 120 utilizes high frequency electromagnetic radiation, but it is also possible to use, for example, a line-of-sight mechanism such as infrared signals (as used in many television remotes), or to use sonar or lower frequency radiation. In addition, in an alternative embodiment, communications unit can include a unit for wirelessly accessing the Internet, or other communication network, and/or to a satellite.

Smart watch 100 also includes a display unit 130 mounted on wrist band 111 and a control unit 140, also preferably mounted on wrist band 111. Display unit 130 can be a conventional LCD or LED display, and can include a touchpad or panel. Control unit 140 includes a processor 142 programmed and connected to deliver commands and receive information from display unit 130, network unit 120 and wrist band unit 110.

With reference to FIGS. 2A, 2B, 2C, 3, 4, and 5, smart watch 100 is depicted in greater detail in a presently preferred embodiment. Wrist band 111 comprises a central, preferably flexible or segmented arcuate section 150 and two end sections 152 and 154. End sections 152 and 154 in a preferred embodiment are normally spaced apart when wrist band unit 110 is not being worn on the wrist of the user, but are attachable to one another and maintained in contact by some means, such as a magnetic coupling in a presently preferred embodiment, but could also be attached by a mechanical linkage assembly. In order to permit end sections 152 and 154 to meet together so that wrist band unit 110 can be placed on the wrist of a user, end sections 152 and 154 are hinged to central portion 150 with hinges 156 and 158, as depicted in FIG. 2C.

Wrist band end section 152 is comprised of an insulated magnetic unit (not shown). Wrist band end 154 includes a memory unit 116, as described above with respect to FIG. 1. Wrist band end section 152 permits a direct mechanical connection of memory unit 116 to, for example a computer (not shown), or a charger (not shown), or through a converter cable (not shown) to a smart phone. Wrist band end section 154 is also coupled to a electrically connectable Universal Serial Bus (USB) terminal 160 that together with memory unit 116 is preferably a conventional flash drive. Memory unit 116 stores computer programs, such as those depicted in FIGS. 10-12, 14, 16 and 17, as well as stores certain data and information generated in smart watch 100 or received by smart watch 100 as an input. As discussed below, such data includes biographic data about the user, information needed to couple with computing device 100, social information, and task and calendar information. Most of this information is stored in memory 116 and is generated in or forwarded by computing device 10 such as a smart phone to smart watch 100. An example of information generated in smart watch 100 and stored in memory 116 is motion information generated by motion detectors 118 and 119. Wrist band unit 110 includes a plurality of notification lights 182, 184, 186, and 188 which display certain statuses of a routine that smart watch 100 is executing. For example, when smart watch 100 receives a NFC signal, one of the notification lights 182, 184, 186, and 188 can blink to notify the user of the receipt of the NFC signal. Wrist band unit 110 also includes an ON/OFF switch 181 as depicted in FIG. 1.

Insertable over end 154 is a magnetic permeable or magnetic, metallic USB cover 164 (See FIG. 2B). Metallic USB cover 164 when applied or attached over end 154 provides a base for a magnetic coupling of end 154 with end 152, which is also made of a permeable magnetic or magnetic material. In alternative embodiments, cover 164 can be connected to end 154 by a strap or line, or by a hinged connection.

Figure 3:
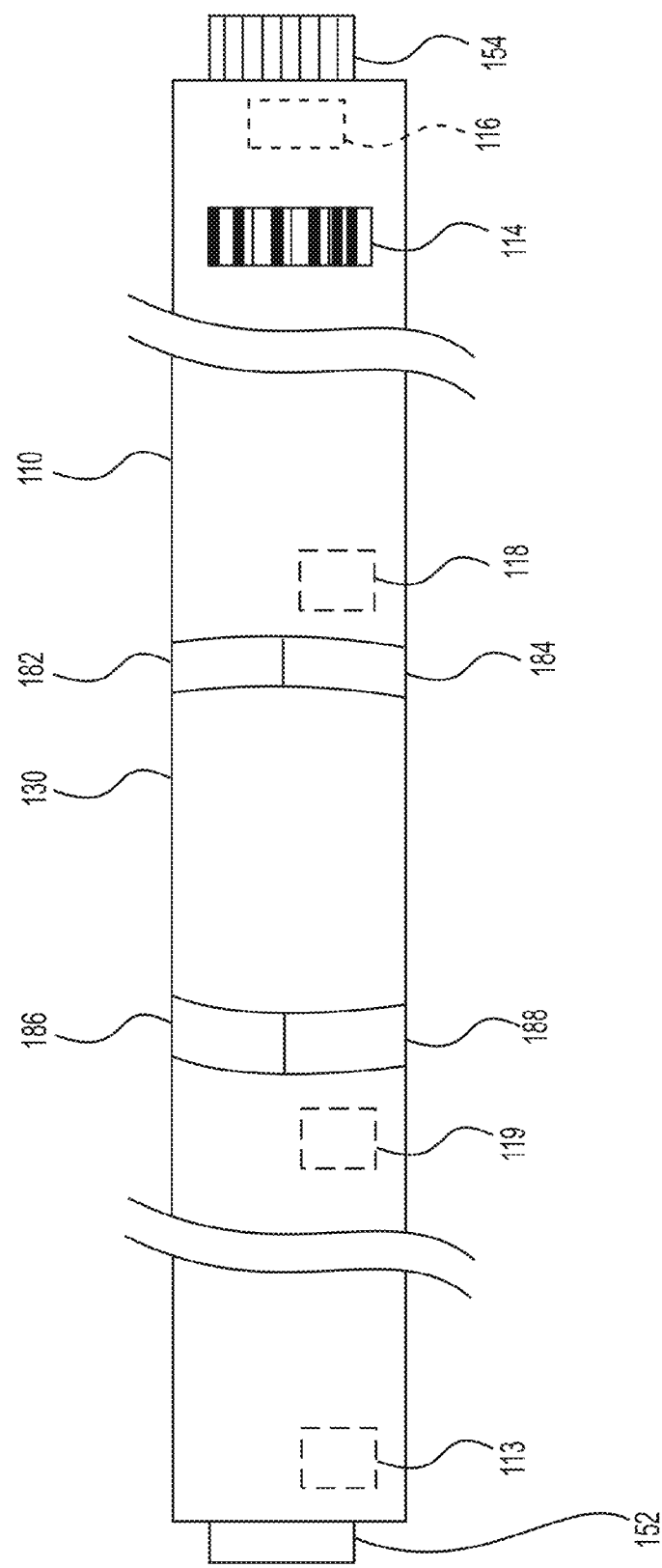
FIG. 3 is a front elevational, expanded, layout view of the wrist band.

Display unit 130 is preferably centrally located on a central section of wrist band 111, as depicted in FIG. 2A. Mounted to wrist band 111 on either side of display unit 130 are a pair of conventional accelerometers or motion detection units 118 and 119, as depicted in FIG. 3, that provides an output of arm movement information (distance, velocity, and acceleration). Display unit 130 is preferably rectangular in shape and is rotatably attached to watch band 111 (see FIGS. 4A-4C). The user can rotate the rectangular display 90 degrees. An orientation sensor (not shown) can also be used to display the information in either a landscape format or a portrait format. Such an orientation sensor is conventional and can be linked to the position of watch band 111 or to the rotational position of display unit 130.

Figure 5:
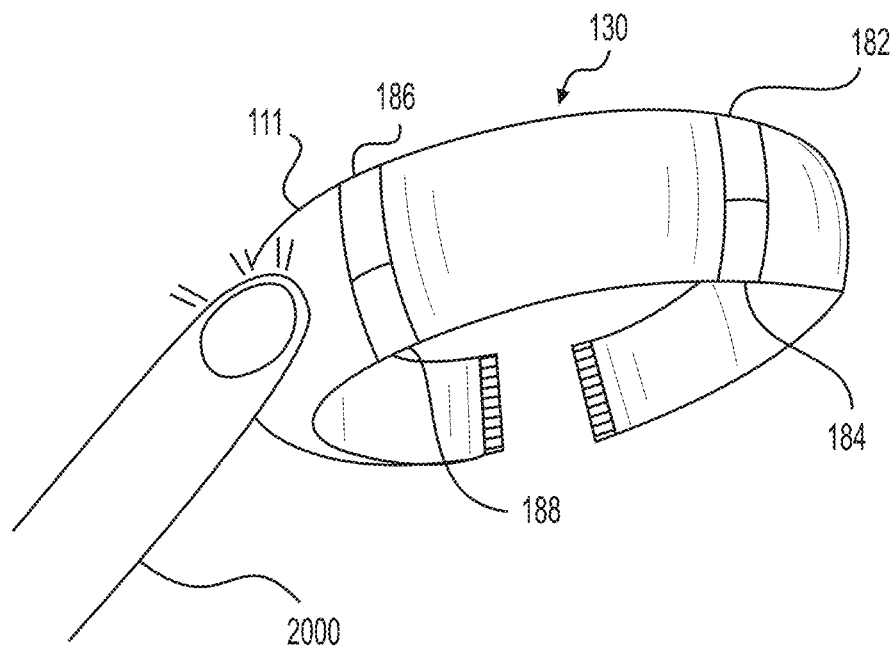
FIG. 5 is a front perspective view of a wrist band that includes a home button function when the user touches the wrist band with his finger.

Wrist band unit 110 can also be comprised of a touchpad/screen layer. With reference now to FIG. 5, such touchpad is configured to function as a reset/home button. The reset/home button is programmed to perform a desired task by a predetermined input. An exemplary of such predetermined input includes a number of finger pressures, a number of touches, and touch time. For instance, FIG. 5 demonstrates that a wrist band functions as a home button when the user touches the wrist band with his or her finger. When the user taps the touchpad located on wrist band 111 once with one finger 2000, then the input functions as a "select button" command. For example, when the user taps the touchpad located on wrist band 111 twice with one finger 2000, then the input functions as a "home button" command. When the user taps the touchpad located on wrist band 111 thrice or three times with one finger 2000, then the input functions as a "scroll/cancel" command. Two touchpads (not shown) can be located on wrist band 111 on each side of display unit 130. Each of the two touchpads can be used as a mouse or a controller. When the smart watch 100 is wirelessly coupled to a network device such as a computer, TV, and video game, the user can touch and control at least one of the touchpads so that the user can use the touchpads to provide extra information to smart watch 100. These examples of the present invention have been disclosed for illustrative purposes only. One of ordinary skill in the art will appreciate that various modifications, additions and substitutions are possible, without departing from the spirit of the invention.

Figure 6A:
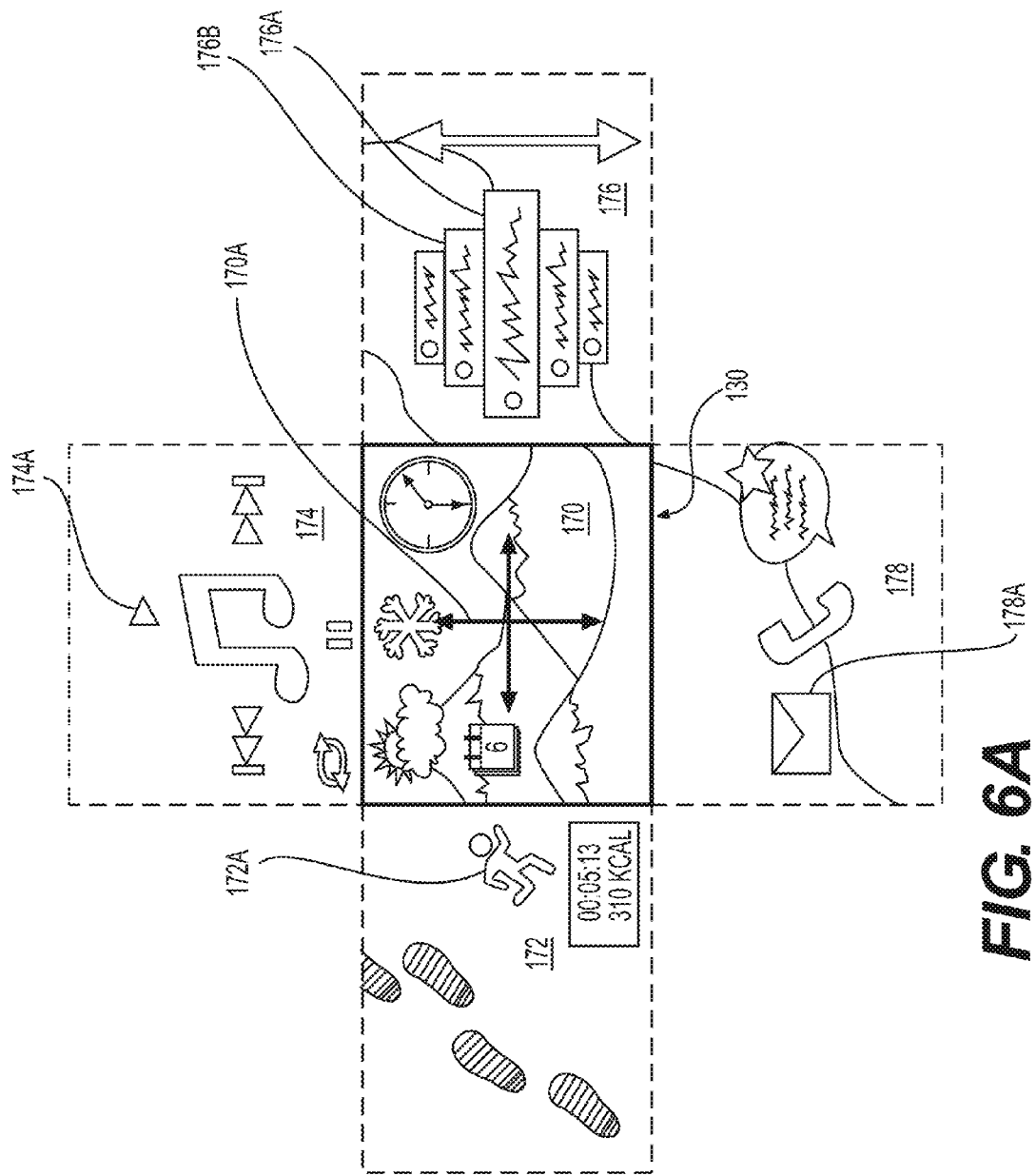
Figure 6B:
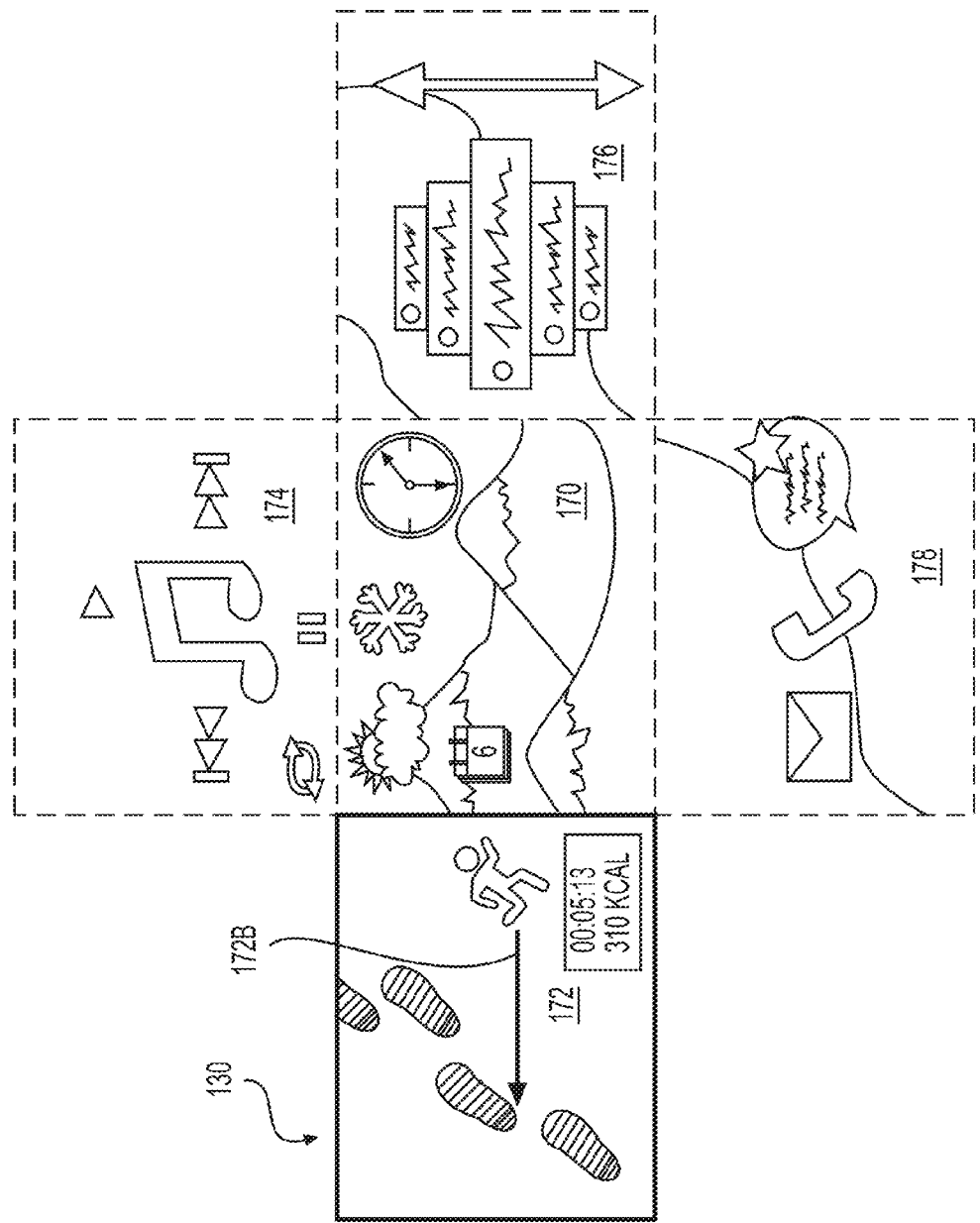

With reference now to FIGS. 6A-6C, display unit 130 has a home screen 170 and a plurality of a first, a second, a third, and a fourth dependent screens 172, 174, 176, and 178, which are displayed depending upon the function being performed or by the user switching manually between them. In this embodiment, four dependent screens are depicted, but the total number of the dependent screens is not limited thereto. One home screen 170 and four dependent screens 172, 174, 176, and 178 forms a cross-shaped interface or User Plus Interface (UPI).

From FIGS. 6A-6C, solid lines around a screen refer to the status of the screen that is currently visible on display unit 130. Dashed lines around a screen refer to the status of the screen as being currently invisible to the user. For example, according to FIG. 6A, home screen 170 is depicted being surrounded by solid lines, and thus home screen 170 is a current screen that the user can see on display unit 130. The plurality of dependent screens 172, 174, 176, and 178 are depicted being surrounded by dashed lines and thus such dependent screens 172, 174, 176, and 178 are invisible or hidden on a current mode. The user can swipe his or her finger on the current screen either vertically or horizontally in one of the indicated directions of arrows 170A to switch from the current screen to one of the other screens.

Home screen 170 shows various factors including time, date and weather. First dependent screen 172 can show a distance the user has run or calories the user has burned. As the user wearing smart watch 100 walks, first dependent screen 172 shows an animated running man icon 172A. The animated running man icon can be programmed to show a running animation corresponding to the user's walking speed.

Second dependent screen 174 can display an audio player. Display unit 130 can be comprised of either a touchpad or a touch screen to receive an input from the user. For example, when display unit 130 is comprised of a touchpad, the user can tap the screen with one finger to play or pause the audio player.

Third dependent screen 176 is configured to show a list of schedules. A current schedule 176A can appear larger than a previous schedule 176B. Third dependent screen 176 can be configured to display a list of other various activities including performances the smart watch 100 has operated.

Figure 7:
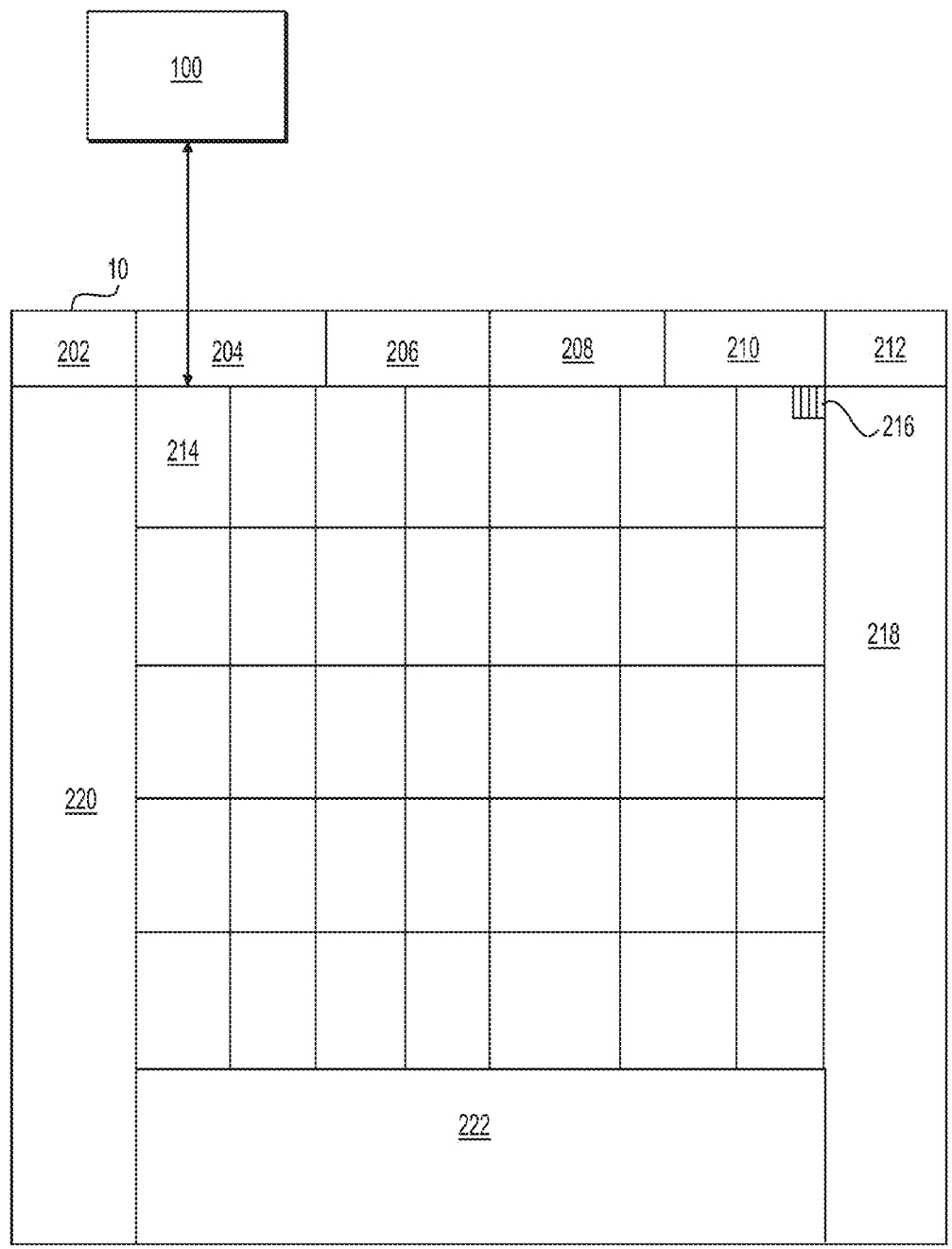
FIG. 7 is a general schematic table of exemplary blocks, referred to as "acti-blocks," which are updated in real time and displayed on the screen of smart phone.

Fourth dependent screen 178 is configured to display notification and any recent updates from a acti-block 214 (see FIG. 7). For example, fourth dependent screen 178 includes an e-mail icon 178A. When the user touches e-mail icon 178A, fourth dependent screen 178 shows the e-mails the user has received.

When the user desires to switch a screen from home screen 170 to first dependent screen 172, the user can touch and drag his finger from left to right on display unit 130. After the user switches the screen, first dependent screen 172 becomes visible, and the other screens 170, 174, 176, and 178 become invisible or hidden, as depicted in FIG. 6B. The user can return back to home screen 170 by dragging his finger on display unit 130 in a direction of arrow 172B. Display unit 130 can be configured to include a setting that switches a pending screen to either home screen 170 or any specific dependent screens 172, 174, 176, and 178. For example, display unit 130 can be configured to switch screens according to the type of inputs by fingers. If the user taps the screen twice with two fingers, then display unit 130 can switch the screen back to home screen 170. If the user taps the screen thrice or three times with three fingers, then display unit 130 can switch the screen to third dependent screen 176. If the user taps the screen four times with three fingers, then display unit 130 can switch the screen to fourth dependent screen 178. Although the exemplary of the present screen displays of the invention have been disclosed for illustrative purposes, those skilled in the art will appreciate that various modifications, additions and substitutions are possible, without departing from the scope and spirit of the invention.

In summary, to switch modes of home screen 170, the user drags his or her finger from top downwardly on display unit 130 and obtains second dependent screen 174A, as depicted in FIG. 6C. Second dependent screen 174 becomes visible, and other screens 170, 172, 176, and 178 become hidden or invisible. The user can return back to home screen 170 by dragging his finger on display unit 130 in a direction of arrow 174A. For example, in a preferred embodiment, as depicted in FIG. 6A, different screen can be selected from a pending screen by swiping either vertically or horizontally in a direction of an arrow 170A.

With reference now to FIG. 7, a diagrammatic illustration of an interface screen between smart phone 10 and smart watch 100 (see FIG. 1) is illustrated. An interface of acti-block computer program includes a plurality of buttons on the screen of computing device 10. Acti-block computer program provides a Social Network Service which is a platform to build social networks or social relations among people who, for example, share interests, activities, backgrounds, or real-life connections. FIG. 7 depicts a user interface of acti-block computer program screen on computing device 10 such as a smart phone or iPod. Acti-block computer program interface includes a logo and home page button 202, a biographic information button 204, a photo album button 206, a message button 208, a grouping information button 210, a notification button 212, acti-block 214, and a statistics button 216, a status update button 218, and control panel tab 220.

Logo and home page button 202 shows a logo of a company and when pushed or tapped by the user, switches the screen to a home screen. Biographic information button 204 includes a link to a profile information of the user. Photo album button 206 has a link to a plurality of photographs and photographic information that the user or his or her friends have uploaded or shared. Message button 208 is conventionally configured to send and receive a message to a friend.

Grouping information button 210 includes conventional algorithms based on tags or common factors. For example, when the user updates his profile or photos, he or she can create and update related tags as well. If the user is interested in a basketball game, grouping information button 210 can display any relevant information related to the basketball game as a result of a search based on the tags. Posting updates button 210 shows any updates the user or the user's friends made recently. Notification button 212 shows any new message from another compatible user, an email invitation, a listing of friends, and updates on comments. Acti-block 214 is configured to update data according to inputs from smart watch 100. Acti-block 214 is configured to have a calendar-like function which displays dates.

Acti-block 214 is configured to be connected and be updated by activities of smart watch 100. For example, if the user wearing smart watch 100 runs 4 miles, then the distance information received from smart watch 100 is transferred to computing divide 10 and acti-block 214 is updated with such information automatically. In this way, acti-block 214 can contain any activity information received from smart watch 100. Such activity information can contain calories, kind of food the user had, budget, list of groceries, profile of friends the user met and any other activities conducted on daily bases. For example, the user can scan several items the user bought with a help of a scanner disposed in smart watch 100 and smart watch 100 calculates the price of the items bought and deduct the price of the items from the predetermined monthly budget. Thus, smart watch 100 can calculate and transfer the information to the acti-block computer program such that the actiblock computer program can display the information such as remaining available funds for the month. Statistics button 216 is configured to show statistics of activities performed in the acti-block computer program. For instance, statistics button 216 can show the calories the user burned for the last one month, a distance the user has walked for the last one month or a monthly budget history calculating and displaying a budge surplus and deficit based on the information the smart watch 100 scanned. Status update button 218 shows any new updates. Control panel tab 220 can be configured to create new tabs according to the user's needs such that the user can control and organize his events. A support tab 222 can be configured to display any contact information of the user's friends, any help message, problem reports or the like in a conventional manner.

Figure 8:
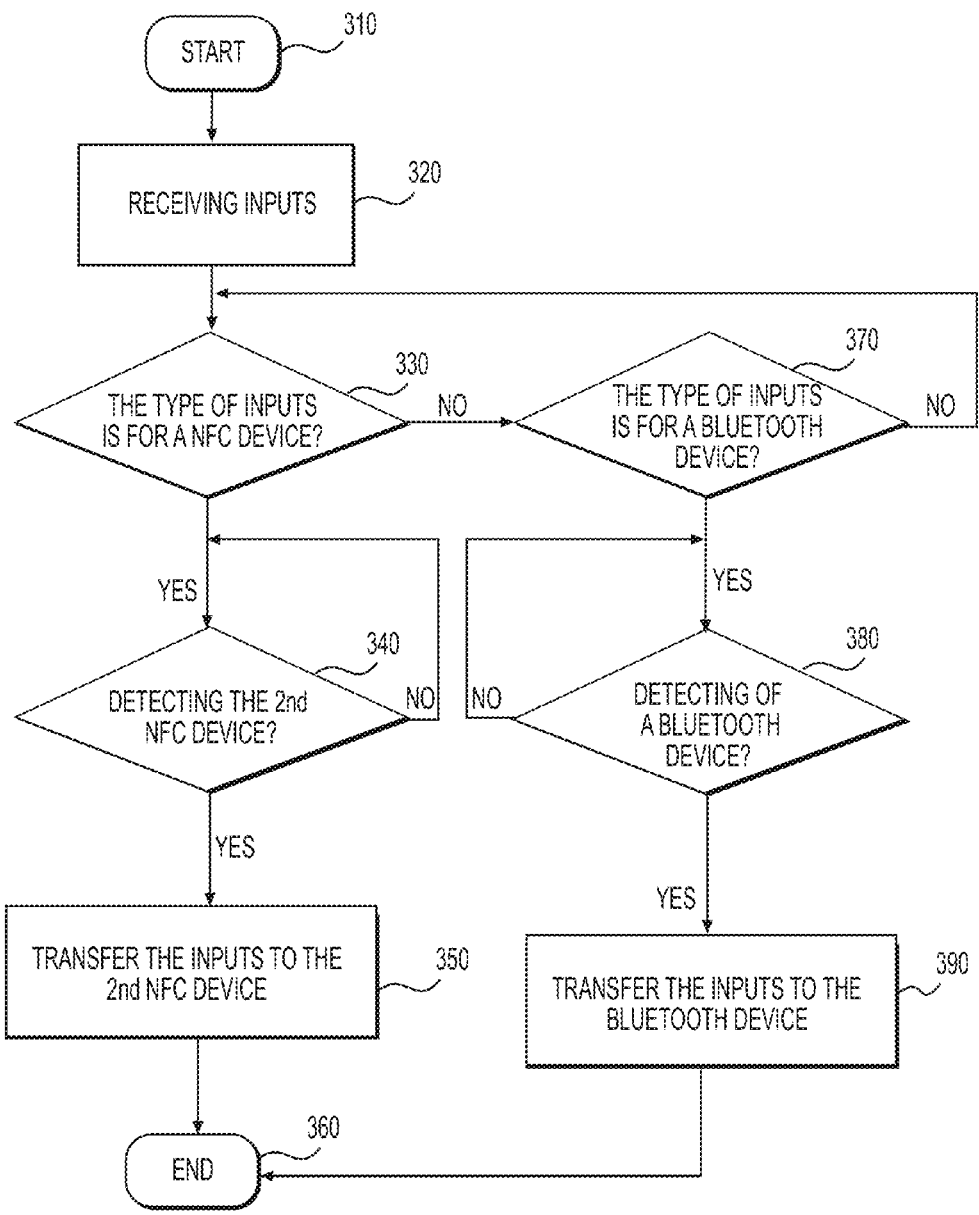
FIG. 8 is a specific schematic flowchart of an input and interface subroutine that is used to direct the flow or transfer of information received by smart watch.

According to a predetermined setting, smart watch 100 can transfer information either to another smart watch 200 (see FIG. 1) or to computing device 10. With reference now to FIG. 8, a subroutine for determining where to transfer input information is depicted. The subroutine begins at a start terminal 310 and proceeds to a step 320 where input information and data to smart watch 100 is obtained. From step 320, the process proceeds to a decision step 330 where it is determined if the type of input is for an NFC device. If the input is for an NFC device, then the program proceeds to a decision step 340 where a determination is made if a second NFC device is detected, such as smart watch 200 (FIG. 1). If it is not detected, then the program repeatedly loops to the top of decision step 340 until the second NFC device is detected. However, if decision step 340 determines that an appropriate NFC device is detected, than the program proceeds to step 350 in which the information is transferred to the second NFC device, and then the program terminates in terminal 360. However, if decision step 330 determines that the input is not for an NFC device, then the program branches to a decision step 370 where it is determined if the type of input is for a Bluetooth device. If the input is for a Bluetooth device, then the program proceeds to a decision step 380 where a determination is made if a Bluetooth device is detected, such as computing device 10 (FIG. 1). If it is not detected, then the program repeatedly loops to the top of decision step 380 until the Bluetooth device is detected. However, if decision step 380 determines that an appropriate Bluetooth device is detected, then the program proceeds to step 390 in which the information is transferred to the Bluetooth device, and then the program terminates in terminal 360. It can be predetermined whether the type of input is for a Bluetooth device or for a NFC device as demonstrated in FIG. 8.

With reference now to FIG. 9, there is presented a table 390 listing the type of wireless inputs and outputs to and from smart watch 100 using either Bluetooth or NFC signals as an exemplary. In general, Bluetooth signals are used when there is a greater distance involved, such as from smart watch 100 to a computing device 10, such as a smart phone. NFC signals are used where the distance is relatively small, such as from one smart watch 100 to another smart watch 200 in close proximity thereto (see FIG. 1). Table 390 shows that a GPS signal and information can be sent from smart phone 10 to smart watch 100 and from smart watch 100 to smart phone by a Bluetooth signal. Similarly, Bluetooth signals are sent to and received by smart watch 100 to carry barcode and QR code information, and/or motion information detected from smart watch 100. On the other hand, business card stored in memory unit 162 can be communicated upon command to a nearby smart watch, such as smart watch 200 by NFC signals.

Figure 10:
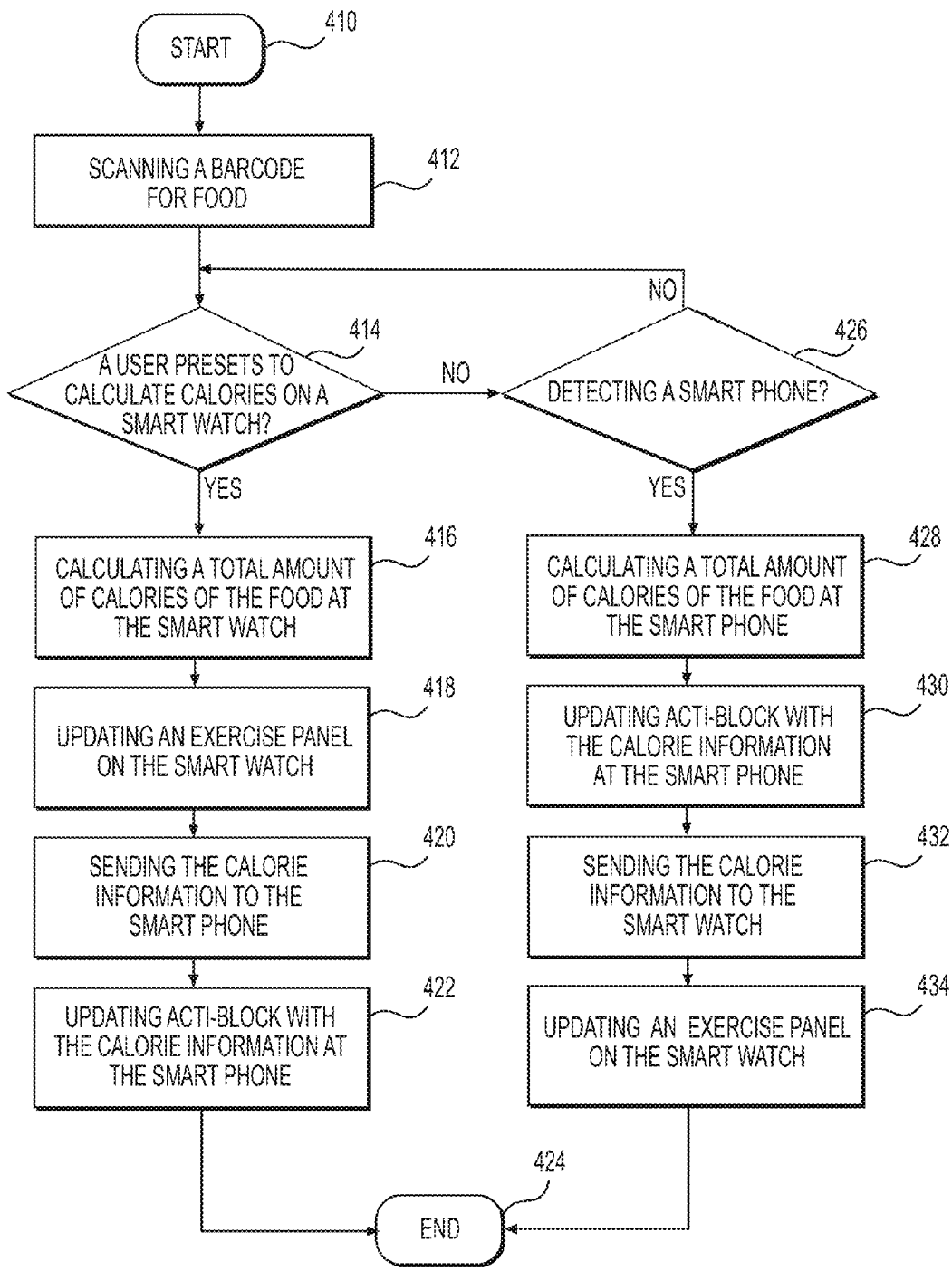
FIG. 10 is a specific schematic flowchart of a subroutine used to scan a barcode for food, calculate calories, and update an associated acti-block and the smart watch.

With reference now to FIG. 10, a subroutine for calculating caloric consumption is depicted. The subroutine begins at a start terminal 410 and then proceeds to a process step 412 to scan a barcode of food that a user will be ingesting. Should the computing capacity at the smart watch be limited, the computing process can be executed at computing device 10 instead of or in addition to that at smart watch 100. The subroutine proceeds to a decision step 414 where it is determined if the user has preset smart watch 100 to calculate the calories of the food. If the setting is preset in that way, then the subroutine proceeds to process step 416 in which a calculation of the total calories consumed is made. From step 416 the subroutine then determines in process step 418 the amount of calories burned through exercise by using information about the exercise that is stored on smart watch 100. In process step 420, the calorie information is sent to computing device 10 in a smart phone 10. In step 422, the acti-block 214 (see FIG. 7) that contains cumulative calorie information is updated, and the subroutine ends at termination terminal 424.

If in decision step 414 it is determined that there is no setting that the calculation is executed on smart watch, then the program branches to a second decision step 426 where it is determined if a smart phone 10 is present. If it is found that there is no smart phone 10 present, then the program loops back to the top of decision step 414. If there is a smart phone 100 present, then the program proceeds to a process step 428 where a calculation of the total amount of calories of the selected food is made at smart phone 10. The program proceeds to process steps 430 and then 432 where the caloric information in the smart phone is updated, and also sent to smart watch 100, respectively. Then before exiting the subroutine at termination terminal 570, the program updates first dependent screen 172 (See FIGS. 6A, 6B, and 6C) on smart watch 100 in step 434.

Figure 11:
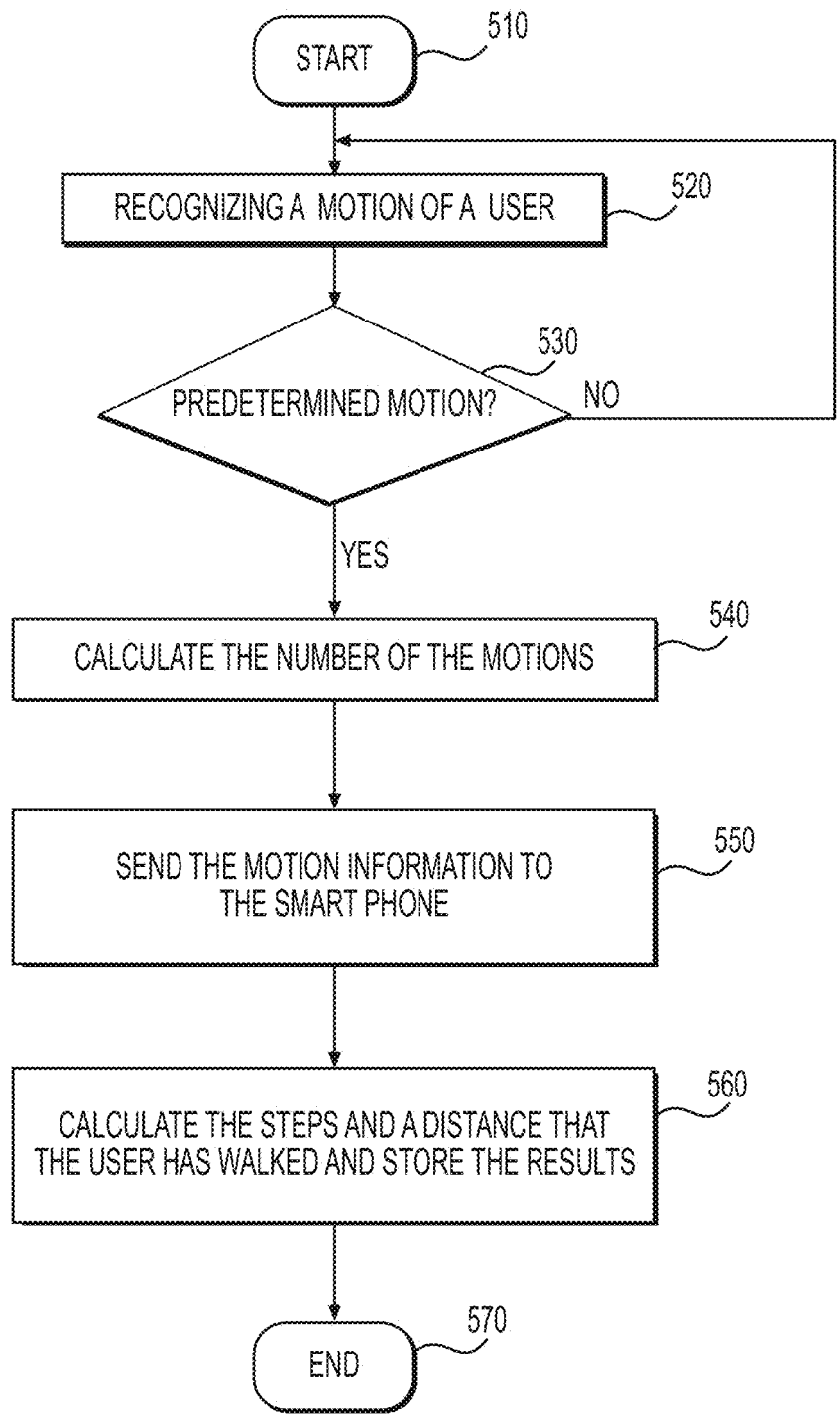
FIG. 11 is a specific schematic flowchart of the subroutine for recognizing and recording motion of the user and storing the result.

With reference now to FIG. 11, a subroutine is disclosed to determine how much exercise a user has had. The subroutine begins in start terminal 510 and proceeds to a process step 620 where the motion of a user is recognized and a determination is made as to what type of motion it is. In the present embodiment, the motions being tracked are those of the wrist on which smart watch 100 is being worn. But because motion of the wrist and arm of the user will be in synchronization with other motions of the body of the user, such as in running or walking, a fairly accurate determination can be made as to the type of motion being done. For example, by determining the velocity and acceleration of an arm being swung, it can be determined if the user is walking or running. Since the distance can be determined by motion detectors 118 and 119 (by double integrating the measured acceleration), and using the elapsed time, the speed of motion can be determined and the amount of calories, for example, can be determined. Thus, the program proceeds from process step 520 to a decision step 530 where it is determined if the detected motion is one of a predetermined type of motion. If it is not, then the program loops back to the top of step 520 and awaits the recognition of a motion of the user. If the detected motion is of a predetermined type, the program branches to process step 540 where a calculation of the number of motions is made. The subroutine then proceeds to process step 550 and then process step 560 where the motion information is sent to smart phone 10 where the number of steps taken are calculated and the information stored, respectively. From step 560 the subroutine terminates in termination terminal 570.

Figure 12:
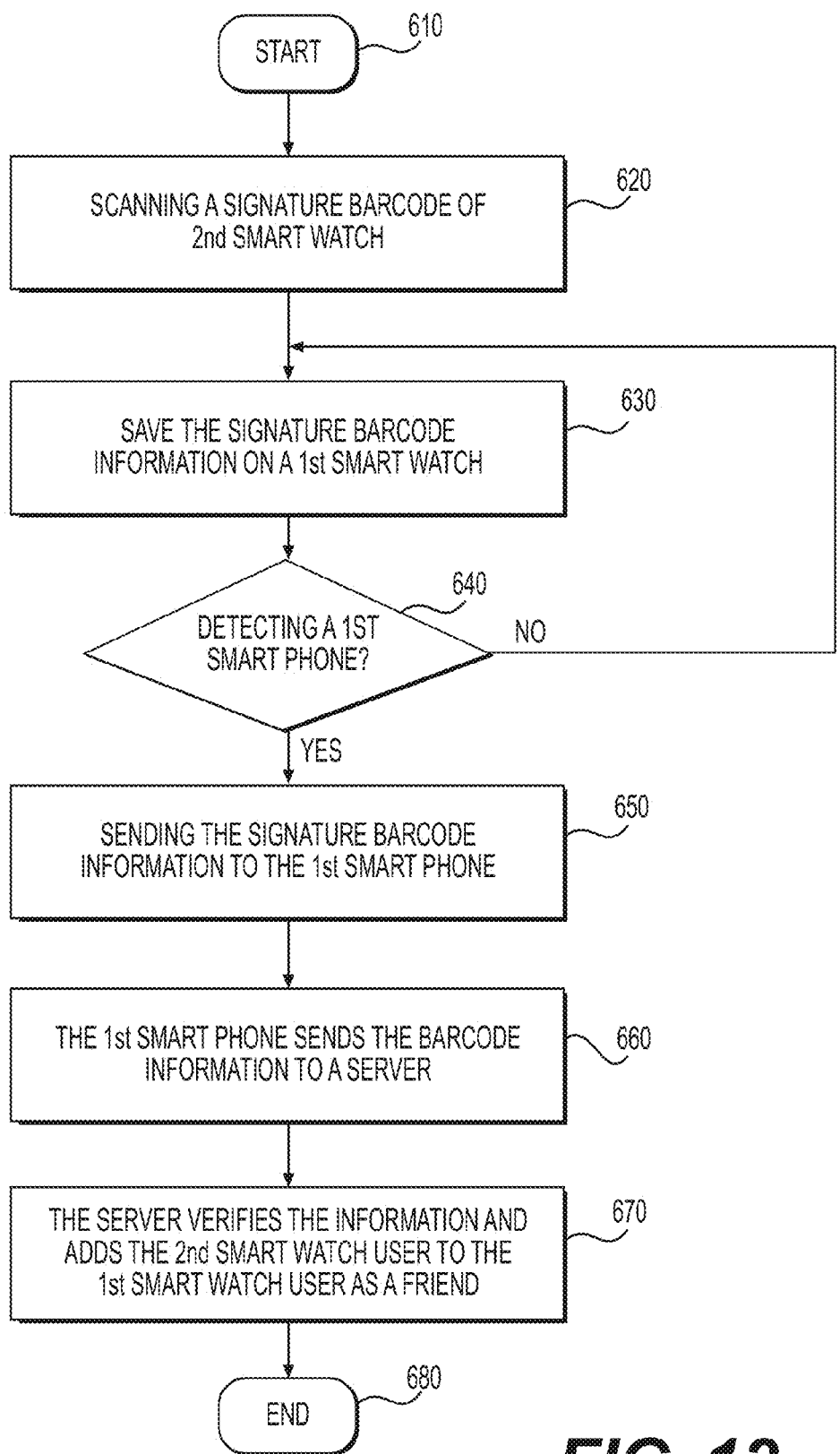
FIG. 12 is a specific schematic flowchart of a subroutine to read, recognize, manage and transmit identifying signature barcode and QR code data from one smart watch (e.g. 100) to a second smart watch (e.g. 200) (See, e.g.
Figure 13:
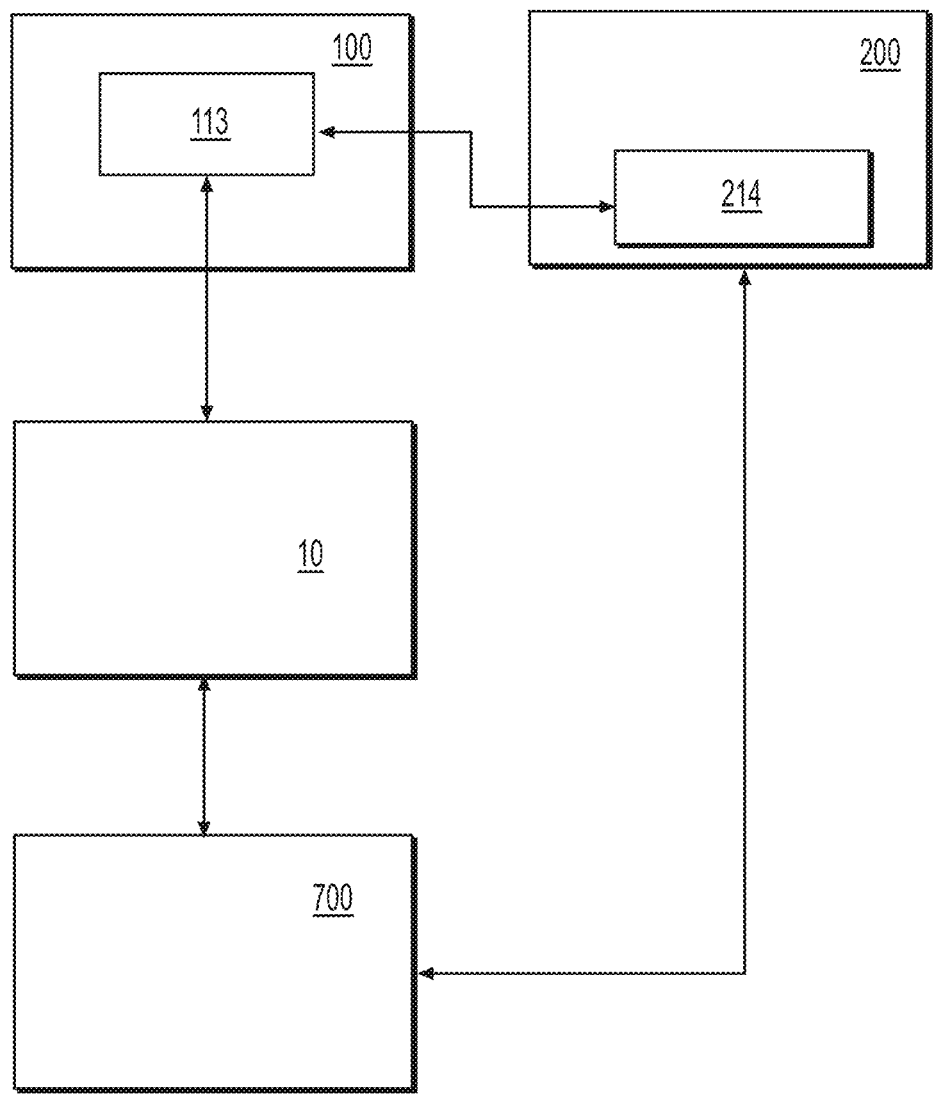
FIG. 13 is a schematic block diagram of the components of a second embodiment of the present disclosure.

With reference now to FIGS. 12 and 13, a process of transferring social information between a first user of a smart watch (e.g. 100) to a second user of a smart watch (e.g. 200), as depicted in FIGS. 1 and 13, is depicted in the disclosed subroutine and hardware block diagram. The social information can be for example information that is contained on a business card. This would include such information as name, title, business or company name, business address, business telephone and facsimile numbers, email address, Skype name and Instant Messenger name. This information is stored in a signature barcode 114 or in smart watch memory unit 162 through an earlier input operation from smart phone 10 or other computer connection. It can also be obtained from a social media network web sites such as Facebook, Linkin, and Twitter.

The subroutine of FIG. 12 begins in start terminal 610 and proceeds to step 620 where the signature barcode 214 of smart watch 200 (of the presumed second user) is read by the barcode scanner 113 of smart watch 100 of the first user. Then the program proceeds to process step 630 wherein the signature barcode information is saved on first smart watch 100. From step 630, the program proceeds to a decision step 640 wherein it is determined if the computing device 10 of the first user can be found. If no smart phone 10 can be found, the program loops back to the beginning of step 630. If a smart phone 10 is detected, the program proceeds to process step 650 where the signature barcode information is sent to computing device 10 of the first user. Then the program proceeds to process step 660 wherein the barcode information is sent to the server 700 (FIG. 13). From server 700, the new "friend" is added to one or more appropriate social networks, or a network provided by the present invention. From step 660, the program proceeds to process step 670 and then to termination terminal 680. In process step 670 server 700 verifies and authenticates the information and adds the second smart phone user 200 to the smart watch of the friend.

The schematic of a hardware configuration that illustrates the operation of the subroutine in FIG. 12 is depicted in FIG. 13. Barcode scanner 113 of the first user reads the signature barcode 214 of the smart watch 200 of the second user through a scanning process. First smart watch 100 is connected through a Bluetooth connection to the smart phone 10 of the first user, which in turn is connected by an internet connection (e.g. a wireless connection) to a server 700. Server 700 uploads the information to a designate web site. Obviously, server 700 is representative and could include other well known alternatives, such as cloud computing.

Figure 14:
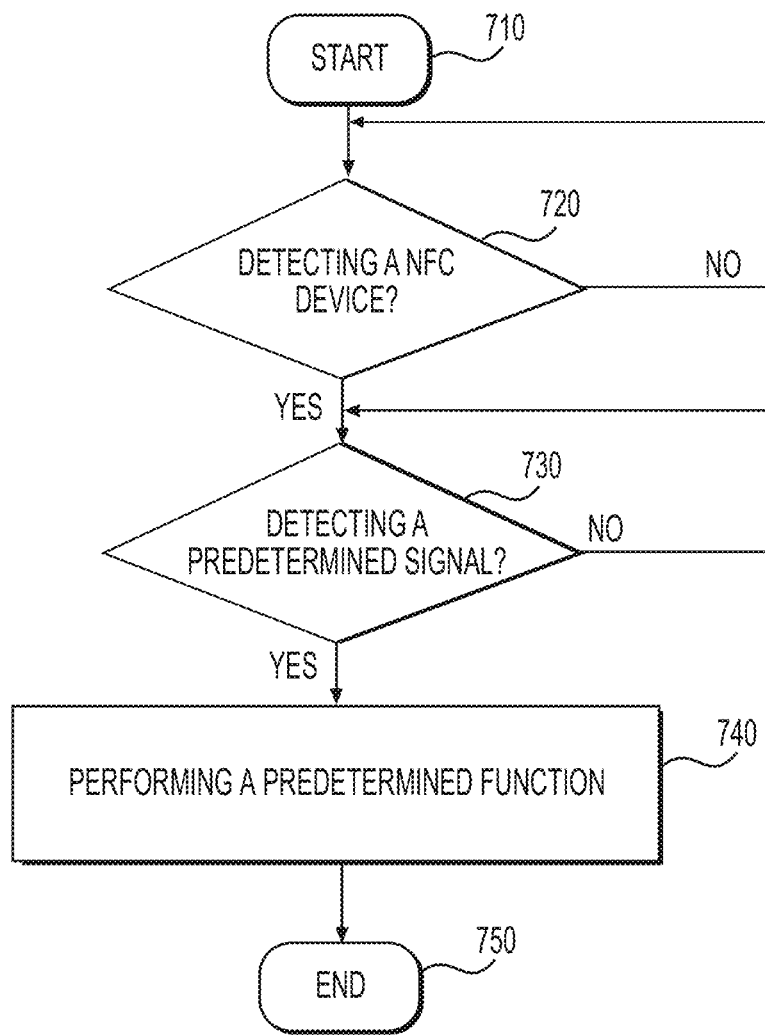
FIG. 14 is a specific schematic flowchart of a subroutine to communicate with another NFC (Near Field Communications) device.

With reference now to FIG. 14, a subroutine that implements a level of security is depicted. The subroutine starts in start terminal 710 and proceeds to a decision step 720 where the presence of an NFC (Near Field Communications) device is determined. An NFC device is one that communicates to another NFC device using weak electromagnetic radiation and the NFC protocol over a very short distance from actual touching to a few inches. A smart phone uses NFC to communicate such information as business cards, photographs, and small files to another smart phone. If an NFC device is detected, the program branches to a second decision step 730 which inquires if the NFC device detects a predetermined signal. One such signal can be a password or predetermined gestures such as handshake. If an NFC device is not detected, the program loops back to the top of decision step 720 to await the receipt of an indication that an NFC device is present. In a similar manner, if a predetermined signal is not detected in decision step 730, the program loops back to the top of decision step 730. If a predetermined signal is detected, the program proceeds to a process step 740 where a predetermined function is performed. An example of such a function would be to check that a transmitted password is acceptable and to allow communication between the two devices. From process step 740 the program exits the subroutine through a termination terminal 750.

Figure 15:
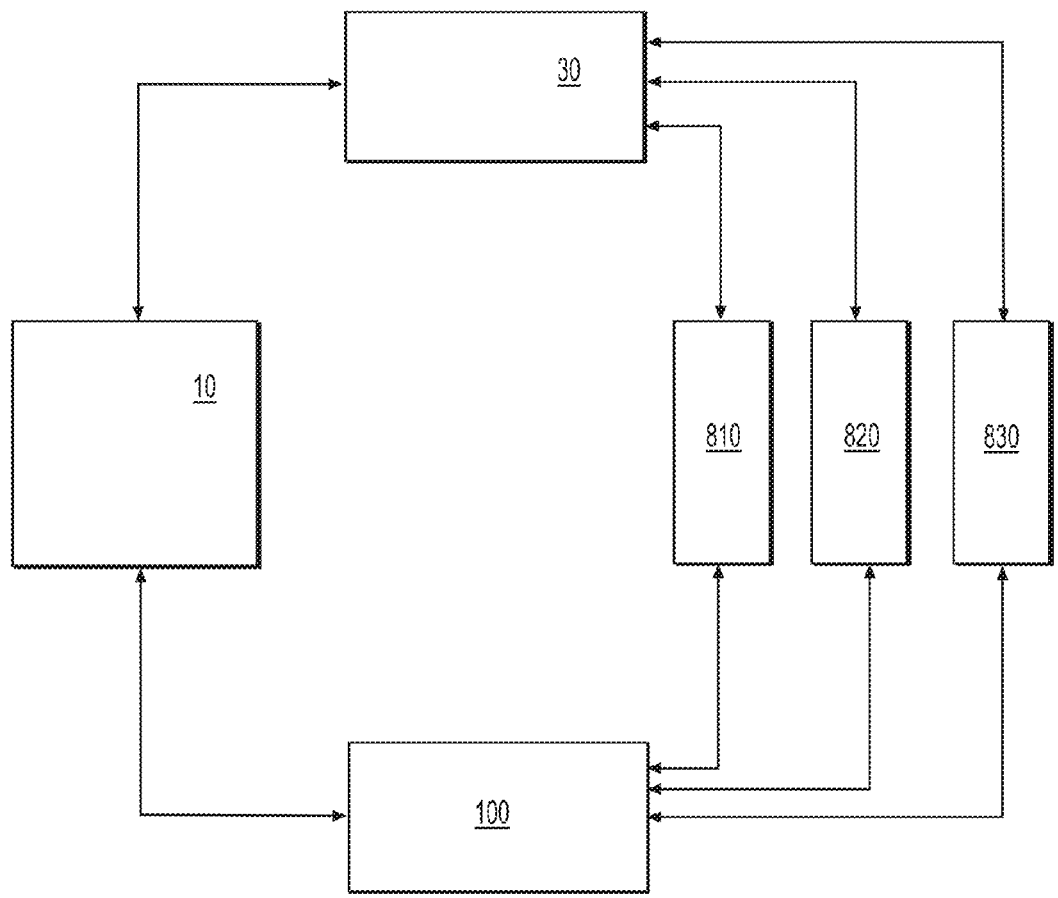
FIG. 15 is a schematic block diagram of different components that can be linked and joined to a smart watch.

A multi-use for a smart watch 100 utilizing the same or universal key or password for several different types of devices is depicted in FIG. 15. Smart watch 100 is bidirectionally connected using Bluetooth to a smart phone 10, which could in alternative embodiments also be a general purpose, programmed computer system. In addition, smart watch 100 is bidirectionally connected using NFC, a scanner or Bluetooth to one of several types of transceivers. For example, smart watch is shown connected to a transceiver 810 that operates a door, to a transceiver 820 that controls several functions of an automobile (e.g. rolling down the windows, starting the car, or turning on the heat or air conditioner), and to a transceiver 830 that controls the operation of a copier. Thus, each of these devices can be controlled by a single smart watch code. Each of transceivers 810, 820, and 830 is bidirectionally connected using wireless network to a server 30, which is also bidirectionally connected using Bluetooth to smart phone 10. The user can use smart watch 100 as an universal key for several different types of devices. In a case that the user lost smart watch 100, the user can change the password for smart watch 100 on server 30.

Figure 16:
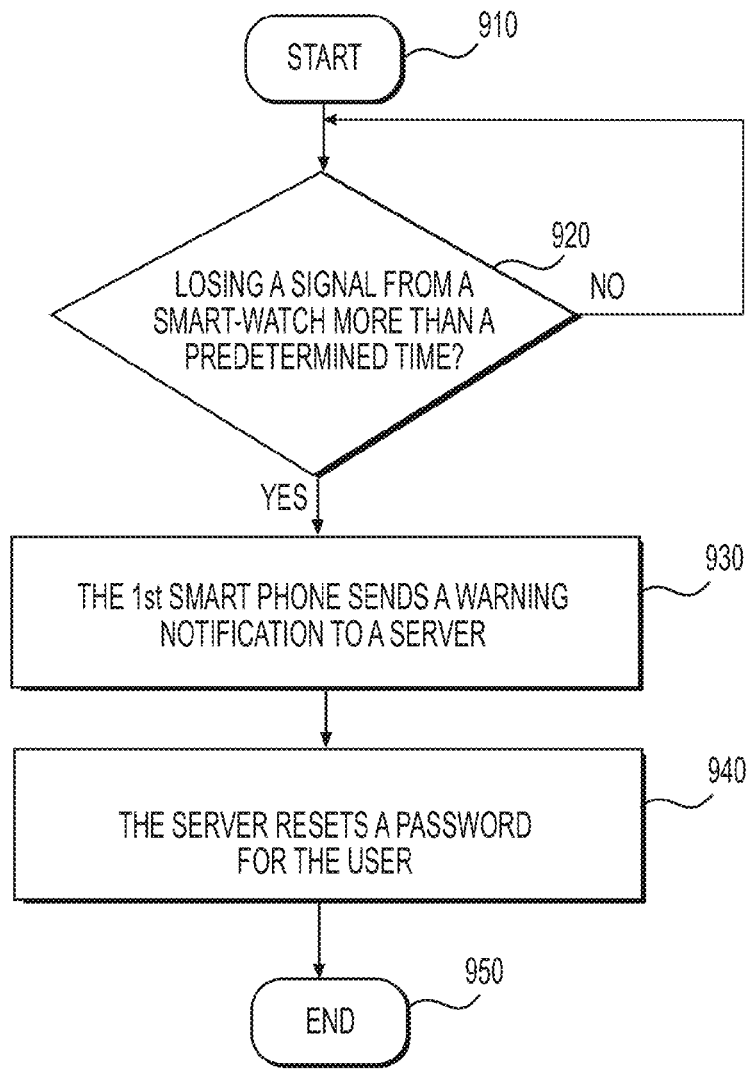
FIG. 16 is a specific schematic flowchart of a subroutine to manage lost communications between a plurality of devices.

With reference now to FIG. 16, a subroutine for monitoring a smart watch is depicted. The subroutine begins in a start terminal 910 and immediately goes to a decision step 920 that determines the time from the last status signal to the present and determines if a signal from smart watch is more than a predetermined amount. If the minimum time since the last signal is longer than a predetermined amount, the program proceeds to a process step 930 in which computing device 10 or smart watch 100 sends a warning signal to a server. The program then proceeds to a process step 940 in which the user's password is reset or changed, and then to termination terminal.

Figure 17:
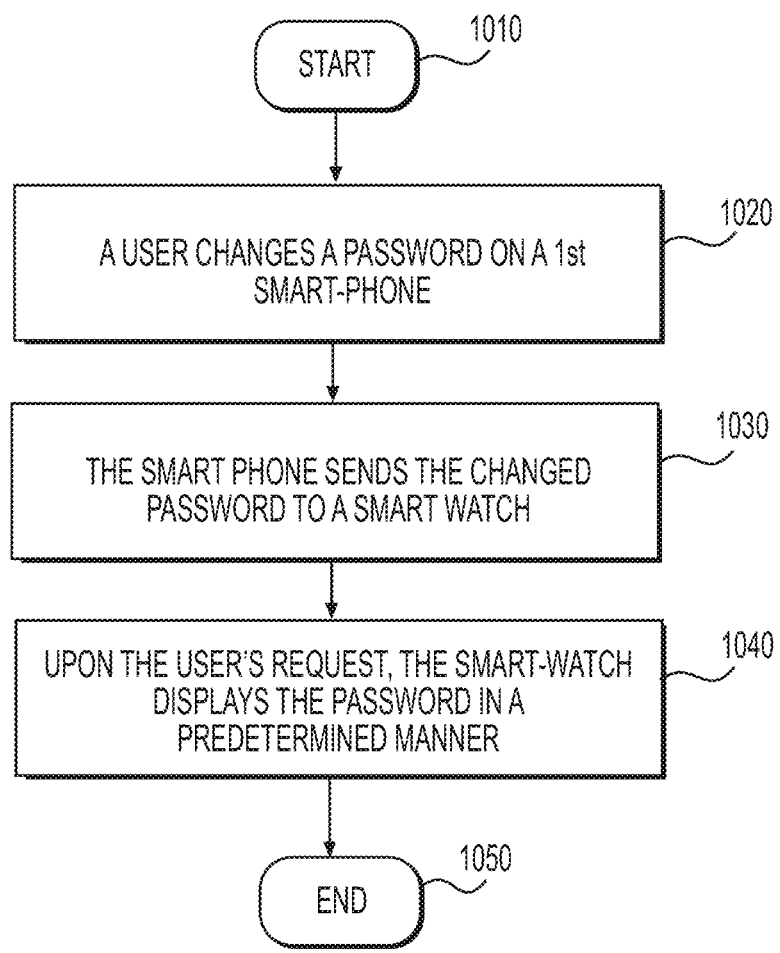
FIG. 17 is a specific schematic flowchart of a subroutine used to change a password of a smart watch and to communicate the changed password to other units.

With reference to FIG. 17, a subroutine for voluntarily or manually changing a password is depicted. The subroutine begins in a start terminal 1010 and immediately goes to a decision step 1020 where a user has voluntarily changed a password on smart phone 10. The program then proceeds to a process step 1030 in which start phone 10 sends the changed password to smart watch 100. From step 1030 the program proceeds to a process step 1040 in which the user is given an opportunity to display the new password in a pre-determined manner, such as a barcode or a QR code. The program then terminates in a termination terminal 1050. Thus, smart watch 100 can display a barcode or a QR code on display unit 130 so that the barcode scanner 213 of another smart watch 200 can read and scan the barcode or QR code on the smart watch's 100 display panel. According to the present invention, smart watch 100 does not need to carry a physical barcode or QR code.

Figure 18:
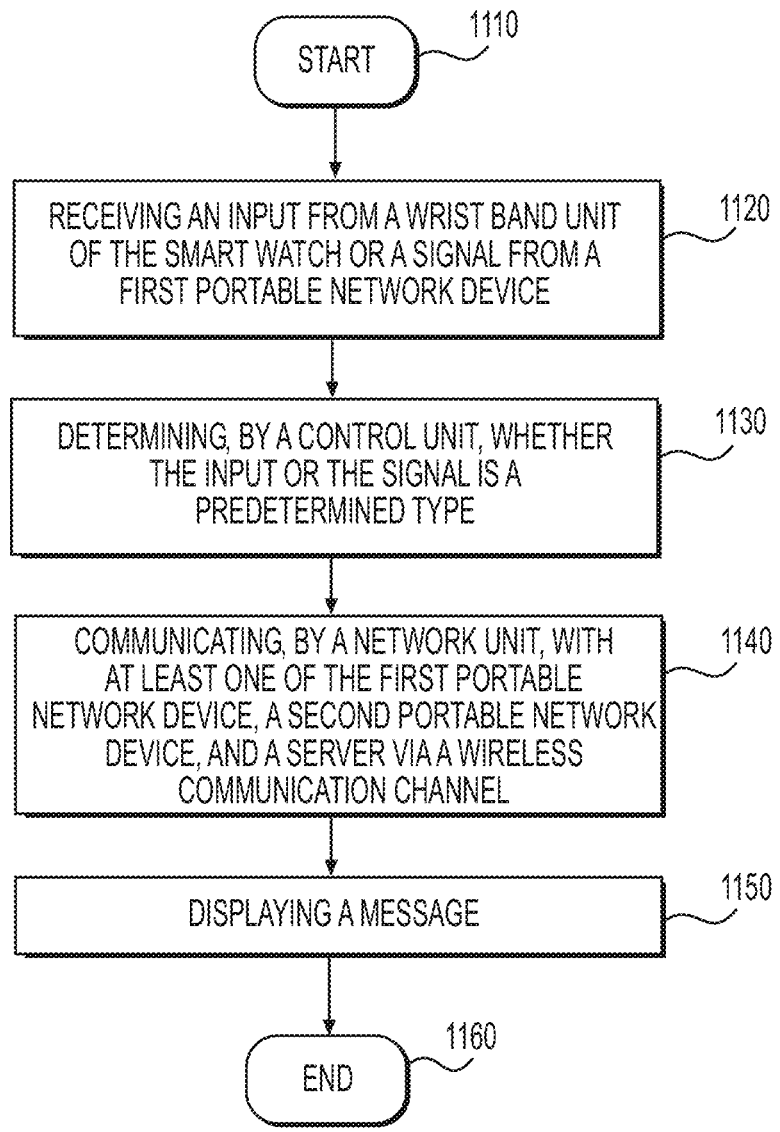
FIG. 18 is a schematic flowchart of a subroutine to display a message.

According to a predetermined setting, smart watch 100 can transfer information either to another smart watch 200 (see FIG. 1) or computing device 10. With reference now to FIG. 18, a subroutine for general procedure for operating a smart watch is depicted. The subroutine begins at a start terminal 1110 and proceeds to a step 1120 where the processor receives an input from a wrist band unit of the smart watch or a signal from a first portable network device. From step 1120, the process proceeds to a decision step 1130, where control unit 140 (FIG. 1) determines whether the input or the signal is a predetermined type. From step 1130, the process proceeds to a communication step 1140, where a network unit communicates with at least one of the first portable network devices, a second portable network device, and a server via a wireless communication channel. From step 1140, the process proceeds to a displaying step 1150, where the display unit 130 displays a message. From step 1150, the process proceeds to end terminal 1160.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

The invention claimed is:

1. A smart watch comprising,
    a band unit that is capable of being worn on a user and is comprised of
        a wrist band layer disposed on the band unit,
        an image capture device disposed on the band unit,
        a power source coupled to the image capture device,
        a memory coupled to the image capture device, and
        a motion detector coupled to the memory;
    a network unit located in said band unit and communicates wirelessly with at least one of a portable network device and a server;
    a display unit being coupled to the power source; and
    a control unit that is comprised of a processor and coupled to the memory, the power source, said display unit, and said network unit, said control unit receiving information from said image capture device, and said motion detector and storing information in said memory,
    wherein said display unit is rotatably attached to said band unit.

2. The smart watch of claim 1, wherein said display unit includes an orientation sensor.

3. A smart watch comprising,
    a band unit that is capable of being worn on a user and is comprised of
        a wrist band layer disposed on the band unit,
        an image capture device disposed on the band unit,
        a power source coupled to the image capture device,
        a memory coupled to the image capture device, and
        a motion detector coupled to the memory;
    a network unit located in said band unit and communicates wirelessly with at least one of a portable network device and a server;
    a display unit being coupled to the power source; and
    a control unit that is comprised of a processor and coupled to the memory, the power source, said display unit, and said network unit, said control unit receiving information from said image capture device, and said motion detector and storing information in said memory,
    wherein said band unit further comprises a signature barcode, a protective removable cover, and a memory connector, and wherein the image capture device is a scanner.

4. A method of operating a smart watch having a band unit, a control unit, a network unit, and a display unit, and configured to be worn on a user's wrist, the method comprising:
    receiving an input from said band unit of said smart watch or a signal from a first portable network device;
    determining, by said control unit, whether the input or the signal is of a predetermined type;
    communicating, by said network unit, with at least one of the first portable network device, a second portable network device, and a server via a wireless communication channel;
    displaying, by said display unit, a message,
    wherein said band unit further comprises an image capture device, a memory and a motion detector, and said control unit comprises a processor, and wherein the input from the band unit includes a recognition of the user's motion,
    determining by said processor whether the user's motion is one of predetermined motions;
    communicating with said second portable network device that can include a smart phone where the second portable network device calculates the number of motions of a user and sends a result back to said smart watch; and
    displaying the message reflecting said calculated result.

5. A method of operating a smart watch having a band unit, a control unit, a network unit, and a display unit, and configured to be worn on a user's wrist, the method comprising:
    receiving an input from said band unit of said smart watch or a signal from a first portable network device;
    determining, by said control unit, whether the input or the signal is of a predetermined type;
    communicating, by said network unit, with at least one of the first portable network device, a second portable network device, and a server via a wireless communication channel;
    displaying, by said display unit, a message,
    wherein said band unit further comprises an image capture device, a memory and a motion detector, and said control unit comprises a processor,
    scanning by said image capture device a signature barcode of the first portable network device and saving the signature barcode information in said memory;
    determining by said processor whether the second portable network device is detected and if detected, communicating by the network unit with said second portable network device and sending signature barcode information to said second portable network device;
    sending by said second portable network device the barcode information to said server; and,
    authenticating by the server the barcode information and if authenticated adding a user of the first portable network device as a friend.

6. A method of operating a smart watch having a band unit, a control unit, a network unit, and a display unit, and configured to be worn on a user's wrist, the method comprising:
    receiving an input from said band unit of said smart watch or a signal from a first portable network device;
    determining, by said control unit, whether the input or the signal is of a predetermined type;
    communicating, by said network unit, with at least one of the first portable network device, a second portable network device, and a server via a wireless communication channel;
    displaying, by said display unit, a message,
    wherein said band unit further comprises an image capture device, a memory and a motion detector, and said control unit comprises a processor;
    comprising receiving by said processor a Near Field Communication signal from said first portable device;
    receiving by said processor a predetermined input including a handshake motion from the band unit or a password signal from the first portable device, and
    communicating by said the network unit to said first portable device predetermined information including a business card information, photographs, and electronic files.

7. A method of operating a smart watch having a band unit, a control unit, a network unit, and a display unit, and configured to be worn on a user's wrist, the method comprising:
    receiving an input from said band unit of said smart watch or a signal from a first portable network device;

determining, by said control unit, whether the input or the signal is of a predetermined type;

communicating, by said network unit, with at least one of the first portable network device, a second portable network device, and a server via a wireless communication channel;

displaying, by said display unit, a message, wherein said band unit further comprises an image capture device, a memory and a motion detector, and said control unit comprises a processor, and wherein if the processor loses a signal from the first portable network device more than a predetermined time, sending by either said smart watch or said first portable network device a warning notification to the server and resetting by said server a password for said smart watch.

8. A method of operating a smart watch having a band unit, a control unit, a network unit, and a display unit, and configured to be worn on a user's wrist, the method comprising:

receiving an input from said band unit of said smart watch or a signal from a first portable network device;

determining, by said control unit, whether the input or the signal is of a predetermined type;

communicating, by said network unit, with at least one of the first portable network device, a second portable network device, and a server via a wireless communication channel;

displaying, by said display unit, a message, wherein said band unit further comprises an image capture device, a memory and a motion detector, and said control unit comprises a processor, and displaying the message either in a barcode or a QR code format.

9. A method of operating a smart watch having a band unit, a control unit, a network unit, and a display unit, and configured to be worn on a user's wrist, the method comprising:

receiving an input from said band unit of said smart watch or a signal from a first portable network device;

determining, by said control unit, whether the input or the signal is of a predetermined type;

communicating, by said network unit, with at least one of the first portable network device, a second portable network device, and a server via a wireless communication channel;

displaying, by said display unit, a message, wherein said band unit further comprises an image capture device, a memory and a motion detector, and said control unit comprises a processor, scanning by said image capture device a barcode for food and according to a predetermined setting, calculating by either said smart watch or said second portable network device calories of the food, and displaying the calorie information and communicating and updating the calorie information of the user by either said second portable network device or said smart watch.

10. A method of operating a smart watch having a band unit, a control unit, a network unit, and a display unit, and configured to be worn on a user's wrist, the method comprising:

receiving an input from said band unit of said smart watch or a signal from a first portable network device;

determining, by said control unit, whether the input or the signal is of a predetermined type;

communicating, by said network unit, with at least one of the first portable network device, a second portable network device, and a server via a wireless communication channel;

displaying, by said display unit, a message, wherein said band unit further comprises an image capture device, a memory and a motion detector, and said control unit comprises a processor, receiving by said processor the signal from said first portable network device; determining the type of inputs; and communicating by said network unit with said first portable network device according to a predetermined setting of the type of input signal.

* * * * *